United States Patent [19]

Rubin et al.

[11] 4,083,592
[45] Apr. 11, 1978

[54] PROTECTIVE STRIP ASSEMBLY

[75] Inventors: Richard J. Rubin; Morton Hollis, both of Newton, Mass.

[73] Assignee: Boston Metal Products Sales Corporation, Cambridge, Mass.

[21] Appl. No.: 757,349

[22] Filed: Jan. 6, 1977

[51] Int. Cl.² .............................................. B60J 11/00
[52] U.S. Cl. .................................... 293/71 R; 293/62
[58] Field of Search ..................... 293/60, 62-70, 293/71 R, 98; 114/219; 52/716, 717, 718; 248/345.1; 49/486, 482, 475

[56] References Cited

U.S. PATENT DOCUMENTS

| 3,388,523 | 6/1966 | Evans | 293/71 R |
| 3,398,921 | 8/1968 | Braun | 248/345.1 |
| 3,897,967 | 8/1975 | Barenyi | 293/71 R |
| 3,899,859 | 8/1975 | Smith | 52/717 |

FOREIGN PATENT DOCUMENTS

| 42,665 | 1/1962 | Denmark | 52/716 |
| 1,066,334 | 6/1954 | France | 248/345.1 |

Primary Examiner—Trygve M. Blix
Assistant Examiner—D. W. Keen

[57] ABSTRACT

A protective strip assembly comprising a resilient strip having a pair of spaced apart legs assembled in a channel member with beads on the side of the channel member engaging grooves in the sides of the legs; center walls are provided in the channel in the space between the legs to prevent inward deflection of the legs upon application of a removal force to the resilient strip thereby to assist in resisting such removal force.

18 Claims, 8 Drawing Figures

U.S. Patent     April 11, 1978     4,083,592
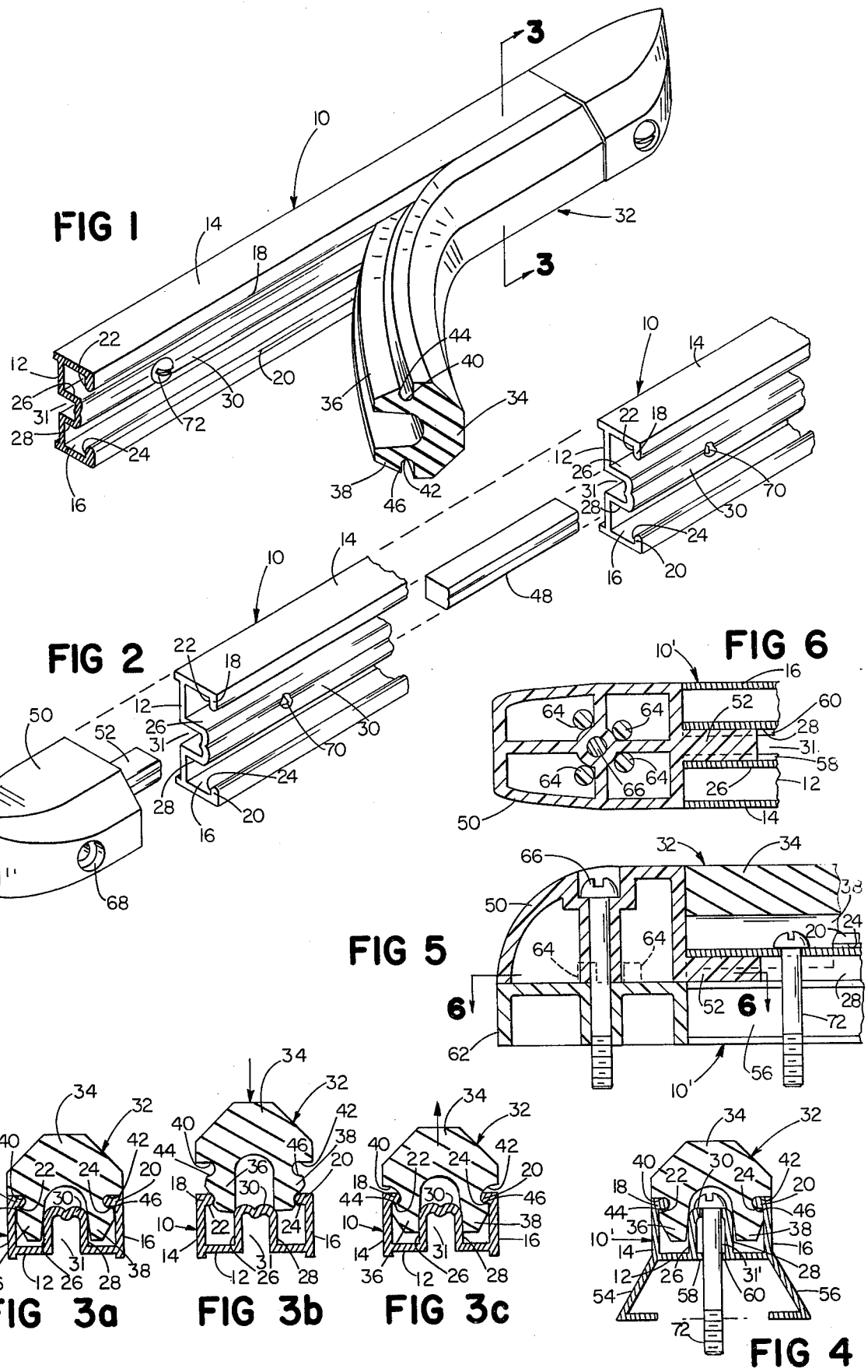

PROTECTIVE STRIP ASSEMBLY

This invention relates to protective strip assemblies and more particularly to bumper strip assemblies for protecting extended wall surfaces and the like from impacts.

Assemblies comprising resilient strip materials in channels of various sorts are known in the art, as illustrated in U.S. Pat. Nos. 3,290,082; 3,398,921; and 3,506,294. In general the portion of the resilient strip retained in the channel is usually solid or comprises a pair of leg portions, generally shown in U.S. Pat. Nos. 3,290,082 and 3,506,294. In their arrangements the outer sides of the resilient strip are engaged by channel beads. However, a removal force typically can compress the resilient material in the channel to permit relatively easy removal of the strip. U.S. Pat. No. 3,398,921, illustrates a system in which the strip is secured to an end cap by separate means, i.e., a staple. Such an arrangement is relatively complex and requires additional assembly steps.

It is an object of this invention to provide a protective strip assembly which improves the retention of the resilient strip against removal by accident or by tampering. It is a further object of the invention to provide such an improved assembly which utilizes a minimal number of parts. It is a further object to provide an assembly which is simple to manufacture and to install. Yet a further object is to provide an assembly suitable for a variety of arrangements in which only the channel need be altered, the remaining basic components interchangeable with different channels.

The invention features a resilient strip and a mounting member, or channel, separately and in combination. With reference to the combination, the strip comprises a body portion extending above the mounting member and having a pair of legs extending into the mounting member. The legs each have, spaced from the bottom, a latch wall facing upwardly. The mounting member comprises upstanding walls extending from a base and within which the legs of the strip are positioned. Latch walls downwardly facing are connected to the upstanding walls and engage the strip latch walls. A pair of center walls extend upwardly from the mounting member base in the space between the legs and spaced closely thereadjacent. The center walls restrain the legs from inward deflection and thereby assist in restraining the disengagement of the latch walls to prevent removal of the strip.

In preferred embodiments, the center walls are spaced inwardly from inner latch wall edges and extend upwardly to a position just below the latch walls. The legs and center walls are closely adjacent at a position substantially below the latch walls. The outer sides of the legs are tapered inwardly below the latch walls and are spaced apart at their bottoms a distance approximately the same or smaller than the distance between the mounting member latch walls.

The mounting member comprises a channel having beads defining the latch walls thereon, the beads extending along the upper edges of the upstanding walls. The latch walls on the resilient strip are defined by grooves extending along the outer sides of the legs, the grooves cooperatively engaging the channel beads.

The center walls are connected by a wall parallel to the channel base and together therewith defines a center channel opposite the resilient strip. A spline fitted in the center channel joins channel sections end to end in accurate alignment. An end cap with a spline in the center channel closes the channel end. Channels having different heights may be utilized with the same strip, spline and end cap elements, utilizing in addition a spacer under the end cap with channels of increased heights.

Other objects, features and advantages of this invention will be apparent to those skilled in the art from the following detailed description of preferred embodiments taken together with the accompanying drawings, in which:

FIG. 1 is an isometric, fragmentary view of a strip assembly according to the invention with the resilient strip partially assembled in the channel;

FIG. 2 is an isometric, exploded view illustrating the assembly of components of the invention;

FIG. 3A is a sectional view taken along the line 3—3 of FIG. 1;

FIGS. 3B and 3C are sectional views similar to that of FIG. 3A illustrating, respectively, the assembly operation and the effects of removal forces applied to the resilient strip;

FIG. 4 is a sectional view similar to that of FIG. 3A illustrating a modified channel member;

FIG. 5 is a longitudinal sectional view of the embodiment illustrated in FIG. 4 at one end thereof; and FIG. 6 is a sectional view along the line 6—6 of FIG. 5.

Referring now to the drawings, particularly FIGS. 1 and 3A thereof, the protective strip assembly essentially comprises an elongated mounting member or channel 10 and a resilient strip 32 which are assembled together. Channel 10 is an aluminum extrusion in the illustrated embodiment but may be made of other relatively rigid materials. Strip 32 is made of an elastomeric material, e.g., synthetic rubber in the illustrated embodiment.

As best shown in FIG. 3A, channel 10 comprises a base 12 and a pair of spaced apart upstanding walls 14,16 at each end of base 12. At the upper edges of walls 14,16 are oppositely disposed spaced apart beads 18,20 extending inwardly toward each other and defining on their lower sides, facing base 12, a pair of latch walls 22,24. Extending upwardly from base 12 are a pair of spaced apart center walls 26,28 connected at the top by a wall 30 parallel to base 12. Center walls 26,28 are spaced inwardly from the inner edges of beads 18,20 and extend upwardly to a position closely adjacent but below the channel latch walls 22,24 defined by beads 18,20. Center walls 26,28, together with wall 30, define a center channel 31 on the side of wall 30 opposite strip 32. As illustrated in FIG. 1 channel 10 is elongated and walls 14,16,22,24,26,28,30, together with base 12 and beads 18,20, extend along the channel length.

Resilient strip 32 comprises a body portion 34 and a pair of spaced apart legs 36,38 extending into channel 10. Again referring to FIG. 3A, grooves 40,42 on the outer sides of legs 36,38 define inwardly extending upwardly facing strip latch walls 44,46 which engage channel latch walls 22,24 to resist removal forces applied to the strip 32. The engagement of beads 18,20 and grooves 40,42 also defines the extent of insertion of strip 32 into channel 10. Below grooves 40,42 the outer sides of legs 36,38 are tapered inwardly to be spaced apart at their bottoms a distance approximately the same as or slightly smaller than the distance between the beads 18,20 and the channel latch walls 44,46 defined thereby. The legs 36,38 are spaced closely adjacent center walls 26,28 at a position substantially below latch walls 22,24,44,46. Center walls 26 resist inward deflection of legs 36,38 resulting from removal forces applied to strip 32.

As illustrated in FIG. 2 a plurality of channel sections 10 may be arranged end to end and are joined together by a spline member 48 positioned in the center channels 31 of adjacent channels 10. An end cap 50 having an integral spline 52 extending into a center channel 31 is placed on the open end of one of channels 10.

The alternate embodiment illustrated in FIGS. 4,5 and 6, differs from the embodiment shown in FIGS. 1–3 in that channel 10' additionally has spacer walls 54,56 extending downwardly from base 12 to space the strip a greater distance from the assembly mounting surface. The same resilient strip 32, splines 48 and end caps 50, however, are employed with the channel 10' of the embodiment illustrated in FIGS. 4–6. Center channel 31' is modified by the provision of beads 58,60 at the bottom thereof to locate splines 48,52. An additional element, spacer 62 is assembled under end cap 50 to properly adjust the end cap height relative to channel 10'. As illustrated in FIGS. 5 and 6 spacer 62 has four upstanding posts 64 engaging a vertical crossed internal web within end cap 50 to properly align the spacer and the end cap.

In a preferred embodiment, end caps 50, splines 48 and spacers 62 are molded from a high impact plastic material.

To assemble the protective strip assembly, an end cap 50 is first secured by a fastener 66 extending through hole 68 in the end cap to a mounting surface at the desired height. If a raised channel 10' is to be employed, a spacer 62 is first assembled under end cap 50. A channel 10 or 10', as appropriate, is then fitted to end cap 50 with end cap spline 52 located in center channel 31. Holes 70 are then drilled through wall 30 of center channel 31 and fasteners 72 are then inserted through holes 70 to secure the channel to its mounting surface. If more than one channel length is required, a spline 48 is inserted into the center channel 31 opposite end cap 50 and an additional channel section is mounted to spline 48 in end to end abutment with the first channel section. Resilient strip 32 is then assembled in channel 10 or 10', starting at end cap 50, as shown in FIG. 1, by pressing the strip into the channel by hand or with a mallet. The pressure compresses the tapered legs of strip 32 as shown in FIG. 3B permitting insertion into the channel. When the strip is assembled in the channel the strip may be trimmed and another end cap placed at the other end of the channel. Once assembled, a removal force, which would tend to hinge legs 36,38 inwardly, is resisted by the engagement of the legs with center walls 26,28, as illustrated in FIG. 3C.

Other embodiments of this invention will occur to those skilled in the art which are within the scope of the following claims.

What is claimed is:

1. A protective strip assembly comprising, in combination, a mounting member and an elongated strip of resilient material secured in said member and extending thereabove, characterized in that:

said resilient strip comprises a body portion extending above said member, a pair of spaced apart legs extending from said body portion into said member, and a pair of oppositely disposed strip latch walls, one on each said leg extending inwardly from the outer side of each said leg and facing upwardly in the direction toward said body portion, said latch walls spaced from the bottoms of said legs; and said mounting member comprises a base, a pair of upstanding walls extending from said base within which said legs are positioned, a pair of oppositely disposed mounting member latch walls, one on each said upstanding wall extending inwardly from the inner side of each said upstanding wall and facing downwardly in the direction toward said base, said mounting member and strip latch walls facing each other for restraining said strip against removal from said mounting member, and a pair of center walls extending upwardly from said base between said upstanding walls in the space between said legs, each said center wall facing outwardly toward one said leg and spaced closely adjacent said leg, said center walls restraining said legs from inward deflection and thereby assisting in restraining said strip against removal from said mounting member.

2. The strip assembly claimed in claim 1 further characterized in that said center walls are spaced inwardly from the inner edges of said mounting member and strip latch walls.

3. The strip assembly claimed in claim 2 further characterized in that said center walls extend upwardly from said base to a position spaced closely adjacent and below said latch walls.

4. The strip assembly claimed in claim 3 further characterized in that said legs and center walls are spaced closely adjacent at a position substantially below the position of said latch walls.

5. The strip assembly claimed in claim 1 further characterized in that the outer sides of said legs below said strip latch walls are tapered inwardly thereby facilitating assembly of said strip to said mounting member.

6. The strip assembly claimed in claim 5 further characterized in that the outer sides of said legs adjacent the bottoms thereof are spaced apart a distance approximately the same as or smaller than the distance between said mounting member latch walls.

7. The strip assembly claimed in claim 1 further characterized in that said mounting member comprises an elongated channel, said base, said upstanding walls and said center walls extending along said channel in the direction of its elongation, and said mounting member latch walls being defined by inwardly extending beads which extend along said upstanding walls in the direction of channel elongation.

8. The strip assembly claimed in claim 7 further characterized in that said strip latch walls are defined by grooves extending along the outer sides of said strip and into which said beads extend, said grooves and beads cooperating to regulate the extent to which said strip may be inserted into said channel.

9. The strip assembly claimed in claim 8 further characterized in that upper ends of said center walls, spaced away from said base, are connected by a wall parallel to said base which, together with said center walls defines a center channel on the side of said parallel wall opposite said strip.

10. The strip assembly claimed in claim 9 further characterized in that a plurality of channels are positioned in end to end relationship and said channels are connected together by spline members, each extending into the center channels of adjacent channels.

11. The strip assembly claimed in claim 10 further characterized in comprising an end cap having a spline extending into the center channel on at least one end of said plurality of said channels, said end cap closing said channel one end.

12. The strip assembly claimed in claim 11 further characterized in that a spacer is positioned beneath said end cap for positioning said end cap relative to the height of said channel.

13. The strip assembly claimed in claim 12 further characterized in that said center walls are spaced inwardly from the inner edges of said mounting member and strip latch walls.

14. The strip assembly claimed in claim 13 further characterized in that said center walls extend upwardly from said base to a position spaced closely adjacent and below said latch walls.

15. The strip assembly claimed in claim 14 further characterized in that said legs and center walls are spaced closely adjacent at a position substantially below the position of said latch walls.

16. The strip assembly claimed in claim 15 further characterized in that the outer sides of said legs below said strip latch walls are tapered inwardly thereby facilitating assembly of said strip to said mounting member.

17. The strip assembly claimed in claim 16 further characterized in that the outer sides of said legs adjacent the bottoms thereof are spaced apart a distance approximately the same as or smaller than the distance between said mounting member latch walls.

18. A channel member for assembly with a resilient strip to form a protective strip assembly comprising:
   a base;
   a pair of upstanding walls extending from said base, said walls having oppositely disposed inwardly facing beads extending along the upper edges thereof spaced from said base;
   a pair of spaced apart center walls extending upwardly from said base, said center walls spaced inwardly away from said upstanding walls and said beads and extending upwardly to a position spaced closely adjacent the height of and below said beads; and
   a wall parallel to and spaced from said base, said parallel wall connecting said center walls adjacent their upper ends and defining therewith a center channel on the side of said parallel wall opposite said beads.

* * * * *